(12) United States Patent
Delker et al.

(10) Patent No.: US 10,048,071 B2
(45) Date of Patent: Aug. 14, 2018

(54) SYSTEM AND METHOD FOR MONITORING AN ANGLE OF A CRIMP TOOL THAT CRIMPS A WEATHER STRIP ONTO A FLANGE OF A VEHICLE

(71) Applicant: GM Global Technology Operations LLC, Detroit, MI (US)

(72) Inventors: Jayce L. Delker, Monroe, GA (US); Gregory A. Farrar, Columbia, TN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 15/281,695

(22) Filed: Sep. 30, 2016

(65) Prior Publication Data
US 2017/0322027 A1    Nov. 9, 2017

Related U.S. Application Data

(60) Provisional application No. 62/332,246, filed on May 5, 2016.

(51) Int. Cl.
*G01C 19/02* (2006.01)
*B21D 39/02* (2006.01)
*B60J 10/00* (2016.01)

(52) U.S. Cl.
CPC .......... *G01C 19/02* (2013.01); *B21D 39/025* (2013.01); *B60J 10/45* (2016.02)

(58) Field of Classification Search
CPC ......... G01C 19/02; B21D 39/025; B60J 10/45
See application file for complete search history.

(56) References Cited

U.S. PATENT DOCUMENTS 3,333,467 A * 8/1967 Hoskins ............... G01L 5/04
19/66 R \* cited by examiner

*Primary Examiner* — Harshad R Patel
*Assistant Examiner* — Jamel Williams

(57) ABSTRACT

A system according to the principles of the present disclosure includes a crimp tool angle sensor, a flange section module, and a diagnostic module. The crimp tool angle sensor measures at least one of a roll angle of a crimp tool, a pitch angle of the crimp tool, and a yaw angle of the crimp tool. The flange section module identifies a flange section of a vehicle on which the crimp tool is disposed based on at least one of the roll angle, the pitch angle, and the yaw angle. The diagnostic module determines whether at least one of the roll angle, the pitch angle, and the yaw angle is within a predetermined range.

20 Claims, 6 Drawing Sheets

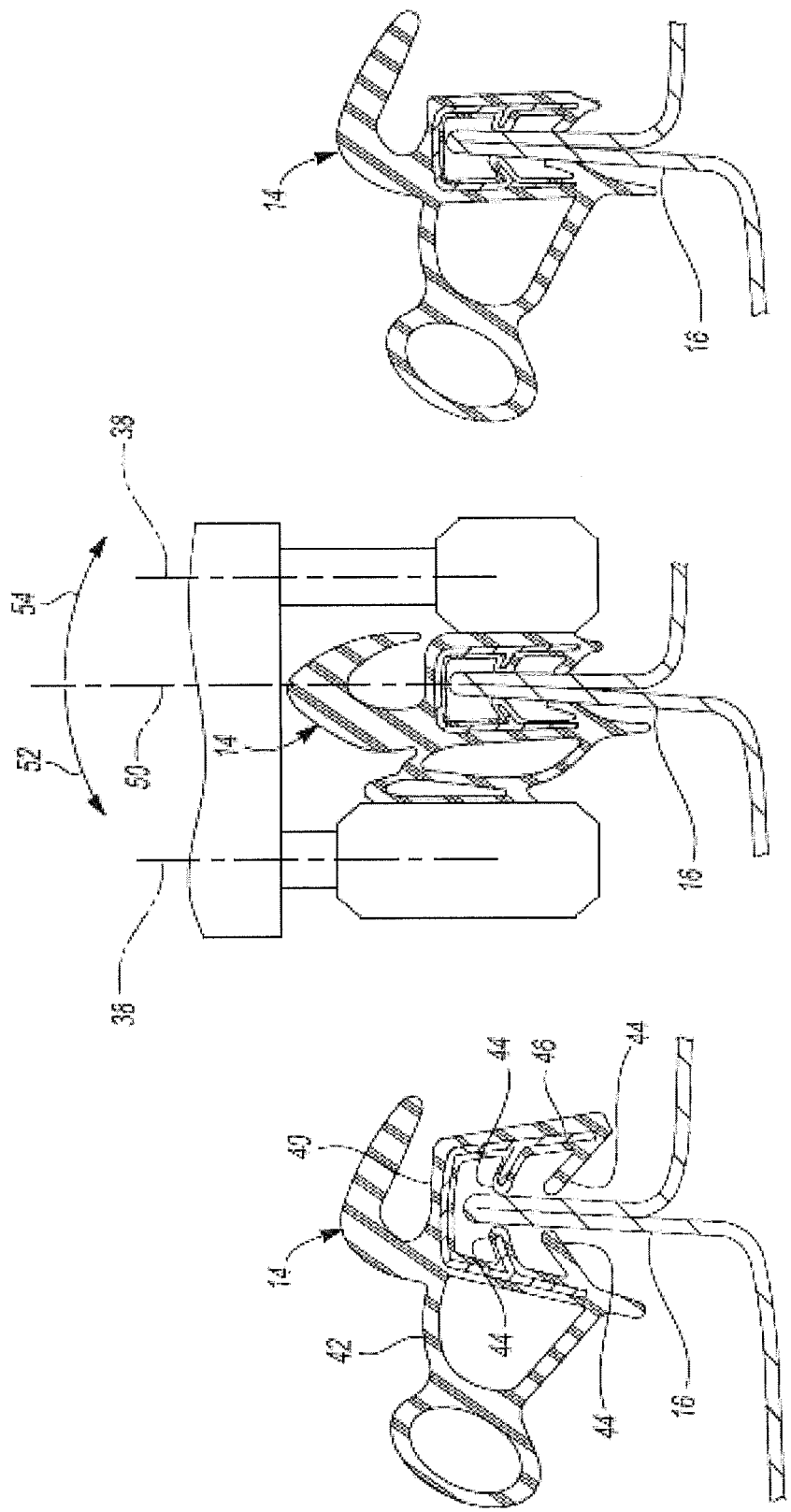

US 10,048,071 B2

SYSTEM AND METHOD FOR MONITORING AN ANGLE OF A CRIMP TOOL THAT CRIMPS A WEATHER STRIP ONTO A FLANGE OF A VEHICLE

CROSS-REFERENCE TO RELATED APPLICATIONS

This application claims the benefit of U.S. Provisional Application No. 62/332,246, filed on May 5, 2016. The disclosure of the above application is incorporated herein by reference in its entirety.

FIELD

The present disclosure relates to systems and methods for monitoring an angle of a crimp tool that crimps a weather strip onto a flange of a vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Weather strips are typically placed around door openings in a vehicle body to create a seal between the doors and the vehicle body. To assemble a weather strip onto the vehicle body, the weather strip is placed on a flange that extends around the perimeter of the door openings. Typically, the weather strip includes a U-shaped section that fits over the flange to temporarily hold the weather strip onto the flange. A crimp tool is then used to press opposite sides of the U-shaped section against the flange. While most of the weather strip is typically made from a polymer, the core of the weather is typically made from metal so that the weather strip permanently deforms as a result of the crimping. In turn, the weather strip is permanently assembled to the flange.

When crimping the weather strip onto the flange, the crimp tool operator typically attempts to maintain the crimp tool in a certain orientation relative to the flange. Typically, the operator does this by relying on subjective feel or muscle memory. If the operator does not maintain the crimp tool in the proper orientation, leaks may develop in the area where the crimp tool was improperly oriented during the crimping process.

SUMMARY

A system according to the principles of the present disclosure includes a crimp tool angle sensor, a flange section module, and a diagnostic module. The crimp tool angle sensor measures at least one of a roll angle of a crimp tool, a pitch angle of the crimp tool, and a yaw angle of the crimp tool. The flange section module identifies a flange section of a vehicle on which the crimp tool is disposed based on at least one of the roll angle, the pitch angle, and the yaw angle. The diagnostic module determines whether at least one of the roll angle, the pitch angle, and the yaw angle is within a predetermined range.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a section view of the weather strip on the flange before the weather strip is crimped by the crimp tool;

FIG. 6 is a section view of the crimp tool crimping the weather strip onto the flange;

FIG. 7 is a section view of the weather strip on the flange after the weather strip is crimped by the crimp tool;

In the drawings, reference numbers may be reused to identify similar and/or identical elements.

DETAILED DESCRIPTION

A crimp tool monitoring system and method according to the present disclosure monitors the orientation of a crimp tool as an operator using the crimp tool to crimp a weather strip onto a flange. In addition, the system and method provides feedback to the operator regarding the orientation of the crimp tool. Thus, rather than relying on subjective feel, the operator can maintain the crimp tool in a certain orientation using objective feedback. Therefore, the system and method may be used to reduce the number of times that a weather strip is improperly crimped to a flange of a vehicle body, which may reduce warranty costs and improve customer satisfaction.

Figure 1:
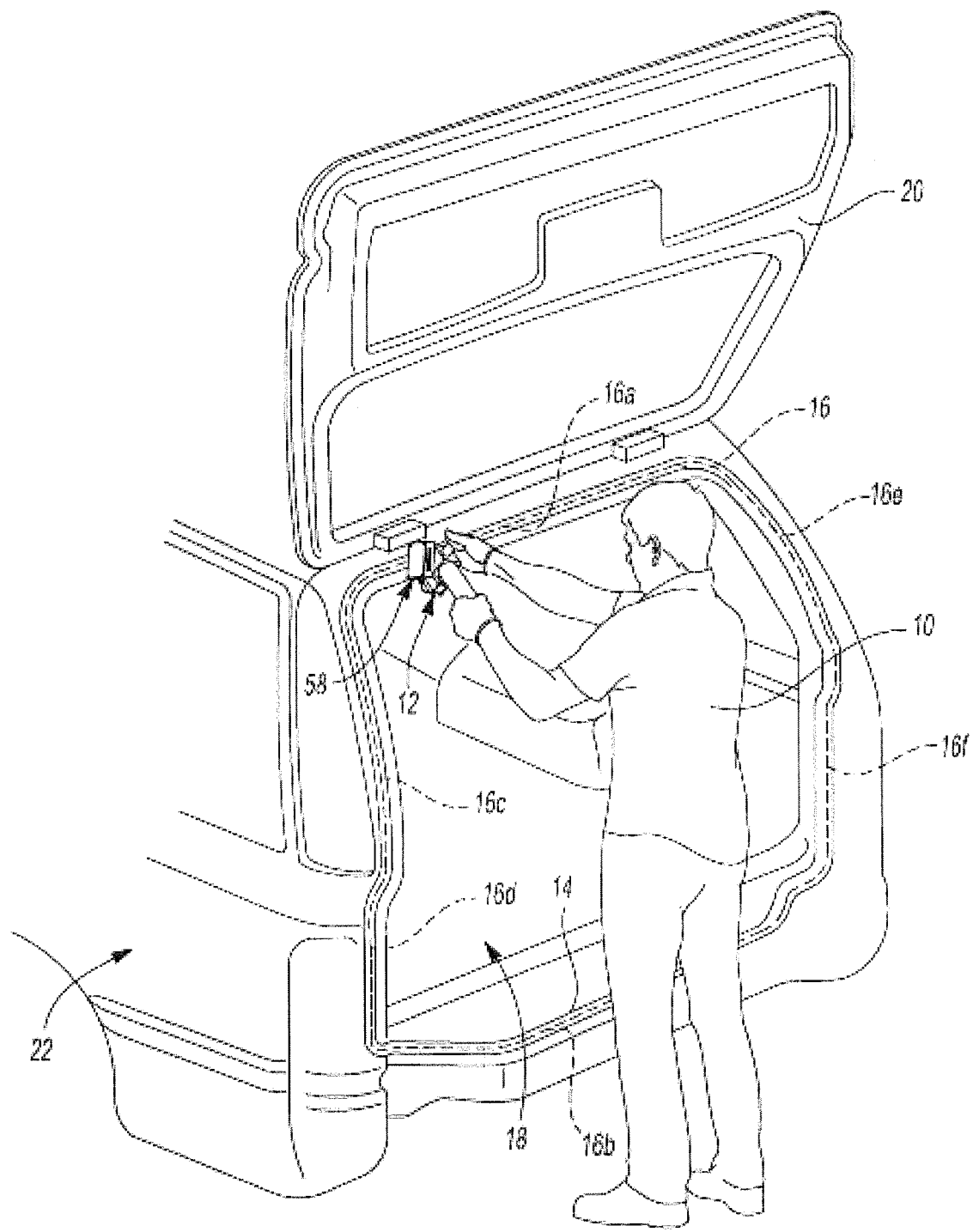
FIG. 1 is a perspective view of an operator using a crimp tool to crimp a weather strip to a flange disposed about a lift gate opening of a vehicle, and an example device for monitoring an angle of the crimp tool according to the present disclosure.
Figure 2:
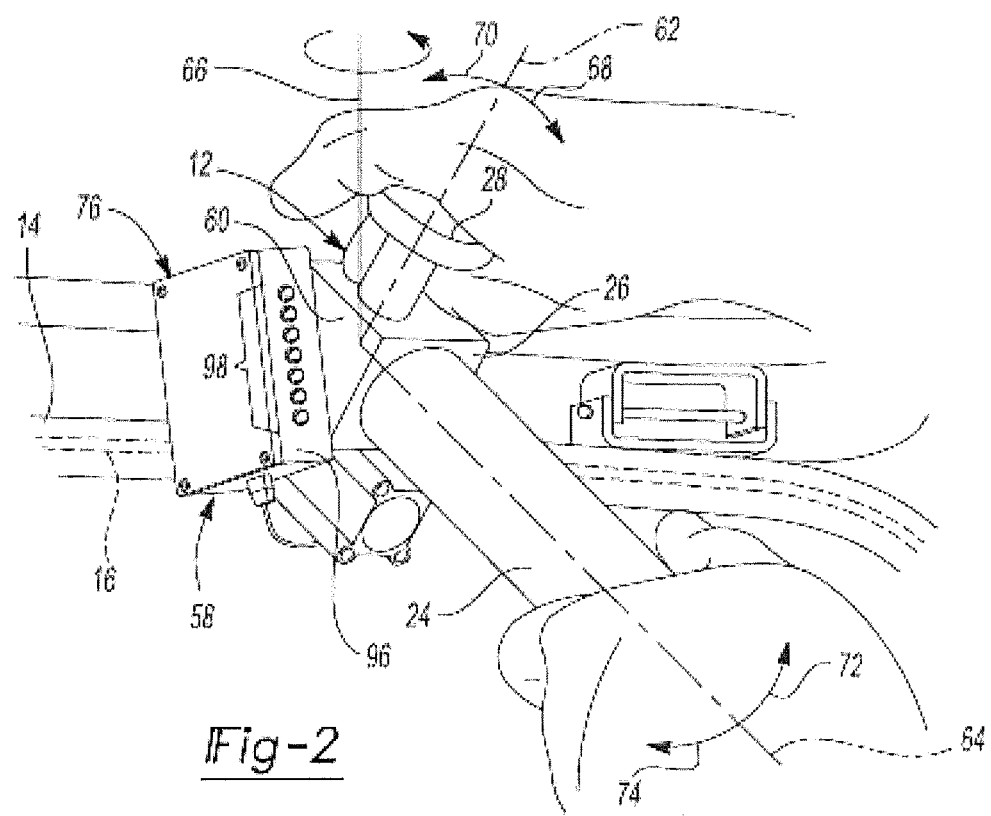
FIG. 2 is an enlarged view of a portion of FIG. 1 illustrating the crimp tool and the crimp tool monitoring device.
Figure 3:
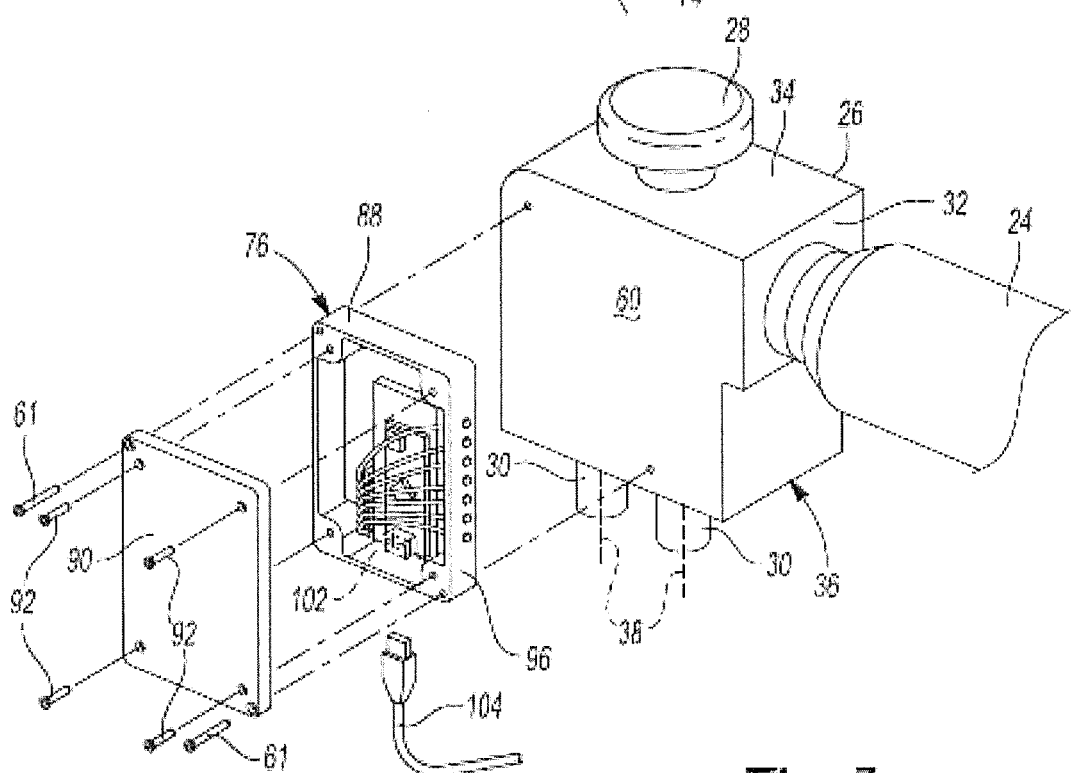
FIG. 3 is an exploded perspective view of the crimp tool monitoring device.

Referring now to FIGS. 1-3, an operator 10 is shown using a crimp tool 12 to crimp a weather strip 14 to a flange 16 disposed about an opening 18 for a lift gate 20 of a vehicle 22. The flange 16 includes a top section 16a, a bottom section 16b, an upper left section 16c, a lower left section 16d, an upper right section 16e, and a lower right section 16f. As shown in FIGS. 2 and 3, the crimp tool 12 includes a handle 24, a head 26, a knob 28, and rollers 30. The handle 24 projects from a rearward surface 32 of the head 26, the knob 28 projects from a top surface 34 of the head 26, and the rollers 30 project from a bottom surface 36 of the head 26. The operator 10 holds the handle 24 and the head 26 when operating the crimp tool 12.

The crimp tool 12 may be pneumatically driven. In one example, the handle 24 may include a fitting (not shown) for an air hose (not shown) and a trigger (not shown) that the operator 10 pulls to allow air from the air hose to enter the head 26 of the crimp tool 12. When air enters the head 26 of the crimp tool 12, the air causes the rollers 30 to rotate about their respective rotational axes 38.

Referring briefly to FIGS. 5, 6, and 7, operation of the crimp tool 12 will now be described. In FIG. 5, the weather strip 14 is placed on the flange 16 but is not yet crimped to the flange 16. The weather strip 14 includes a U-shaped body 40 that fits over the flange 16, a hollow body 42 that creates a seal between the flange 16 and the lift gate 20, a plurality of fingers 44 that project inward from the U-shaped body 40, and an inner core 46 that is disposed within the U-shaped body 40 and at least some of the fingers 44. The inner core 46 may be made from metal, and the remainder of the weather strip may be made from a polymer. When the weather strip 14 is placed on the flange 16, the fingers 44 may temporarily hold the weather strip 14 onto the flange 16 while the weather strip 14 is crimped.

FIG. 6 shows the crimp tool 12 crimping the weather strip 14 onto the flange 16. To crimp the weather strip 14 onto the flange 16, the operator 10 positions the crimp tool 12 relative to the flange 16 so that the rollers 30 are disposed on opposite sides of the flange 16. In addition, the operator 10 attempts to orient the crimp tool 12 so that the rotational axes 38 of the rollers 30 are parallel to a central axis 50 of the flange 16.

The orientation of the rotational axes 38 of the rollers 30 relative to the central axis 50 of the flange 16 may be referred to as a pitch angle of the crimp tool 12. The pitch angle of the crimp tool 12 may be 0 degrees when the rotational axes 38 of the rollers 30 are parallel to the central axis 50 of the flange 16. Thus, the operator 10 attempts to orient the crimp tool 12 so that pitch angle of the crimp tool 12 is 0 degrees. The pitch angle of the crimp tool 12 may be positive (i.e., greater than zero) when the crimp tool 12 is titled in a direction 52 relative to the central axis 50 of the flange 16. The pitch angle of the crimp tool 12 may be negative (i.e., less than zero) when the crimp tool 12 is titled in a direction 54 relative to the central axis 50 of the flange 16.

When the operator 10 is satisfied that the crimp tool 12 is positioned properly on the flange 16, the operator 10 causes the rollers 30 to rotate about their respective rotational axes 38. As discussed above, the crimp tool 12 may be pneumatically driven, and the operator 10 may cause the rollers 30 to rotate by allowing air to enter the head 26 of the crimp tool 12. When the rollers 30 rotate, engagement between side surfaces 56 of the rollers 30 and the weather strip 14 causes the crimp tool 12 to move along the flange 16. In this manner, the rollers 30 propel the crimp tool 12 along the flange 16.

As the crimp tool 12 moves along the flange 16, the rollers 30 crimp the weather strip 14 onto the flange 16 by pressing both sides of the U-shaped body 40 against the flange and thereby permanently deforming the inner core 46 of the weather strip 14. FIG. 7 shows the weather strip 14 after the weather strip 14 is crimped onto the flange 16. In this state, the fingers 44 of the weather strip 14 grip the flange 16 to permanently hold and seal the weather strip 14 onto the flange 16.

While moving the crimp tool 12 along the flange 16, the operator 10 attempts to maintain the orientation of the crimp tool 12 relative to the flange 16 so that the pitch angle of the crimp tool 12 remains 0 degrees. However, various factors may cause the operator 10 to tilt the crimp tool 12 relative to this orientation. For example, the top section 16a of the flange 16 may be above the head of the operator 10, which may make it difficult for the operator 10 to maintain the pitch angle of the crimp tool 12 at 0 degrees. In another example, the operator 10 may be new and therefore may not have developed a feel (e.g., muscle memory) for when the pitch angle of the crimp tool 12 at 0 degrees.

The crimp tool 12 may crimp the weather strip 14 onto the flange 16 properly as long as the pitch angle of the crimp tool 12 is within a target range (e.g., +/−15 degrees). However, when the pitch angle of the crimp tool 12 is outside of the target range, the crimp tool 12 may not properly crimp the weather strip 14 onto the flange 16. As a result, leaks may develop at the section(s) of the flange 16 where the pitch angle of the crimp tool 12 was outside of the target range while the crimp tool 12 during the crimping process, which may increase warranty cost and cause customer dissatisfaction.

Referring again to FIGS. 1-3, to prevent the issues discussed above, a crimp tool monitoring device 58 may be used to monitor the orientation of the crimp tool 12 and to indicate the crimp tool orientation to the operator 10 during the crimping process. Although the device 58 is described in the context of the lift gate opening 18, the device 58 may be used to monitor the pitch angle of the crimp tool 12 in other areas of the vehicle 22. In FIGS. 1 and 2, the device 58 is shown separate from the crimp tool 12 and attached to a side surface 60 of the head 26 of the crimp tool 12. However, in various implementations, the device 58 may be integrated into the crimp tool 12.

In the example shown, the device 58 is attached to the crimp tool 12 using fasteners 61 that extend through the device 58 and into the side surface 60 of the crimp tool 12. However, the device 58 may be attached to the crimp tool 12 in other ways including releasably attaching the device 58 to the crimp tool 12 so that the device 58 can be detached from the crimp tool 12 by hand. For example, the device 58 may be attached to the crimp tool 12 using Velcro®, zip ties, and/or snap fit mechanisms.

In addition to the pitch angle of the crimp tool 12, the device 58 may monitor a roll angle of the crimp tool 12 and/or a yaw angle of the crimp tool 12. The roll, pitch, and yaw angles of the crimp tool 12 may be measured relative to an axis 62, an axis 64, and an axis 66, respectively. The roll angle of the crimp tool 12 may be 0 degrees when a central axis of the knob 28 is collinear with the axis 62. The roll angle of the crimp tool 12 may be positive (i.e., greater than zero) when the operator 10 tilts the crimp tool 12 in a direction 68 by, for example, moving the knob 28 to the left while allowing the handle 24 to rotate about the axis 64. The roll angle of the crimp tool 12 may be negative (i.e., less than zero) when the operator 10 tilts the crimp tool 12 in a direction 70 by, for example, moving the knob 28 to the right while allowing the handle 24 to rotate about the axis 64.

The pitch angle of the crimp tool 12 may be 0 degrees when a central axis of the handle 24 is collinear with the axis 64. The pitch angle of the crimp tool 12 may be positive (i.e., greater than zero) when the operator 10 tilts the crimp tool 12 in a direction 72 by, for example, raising the handle 24. The pitch angle of the crimp tool 12 may be negative (i.e., less than zero) when the operator 10 tilts the crimp tool 12 in a direction 74 by, for example, lowering the handle 24.

Figure 4:
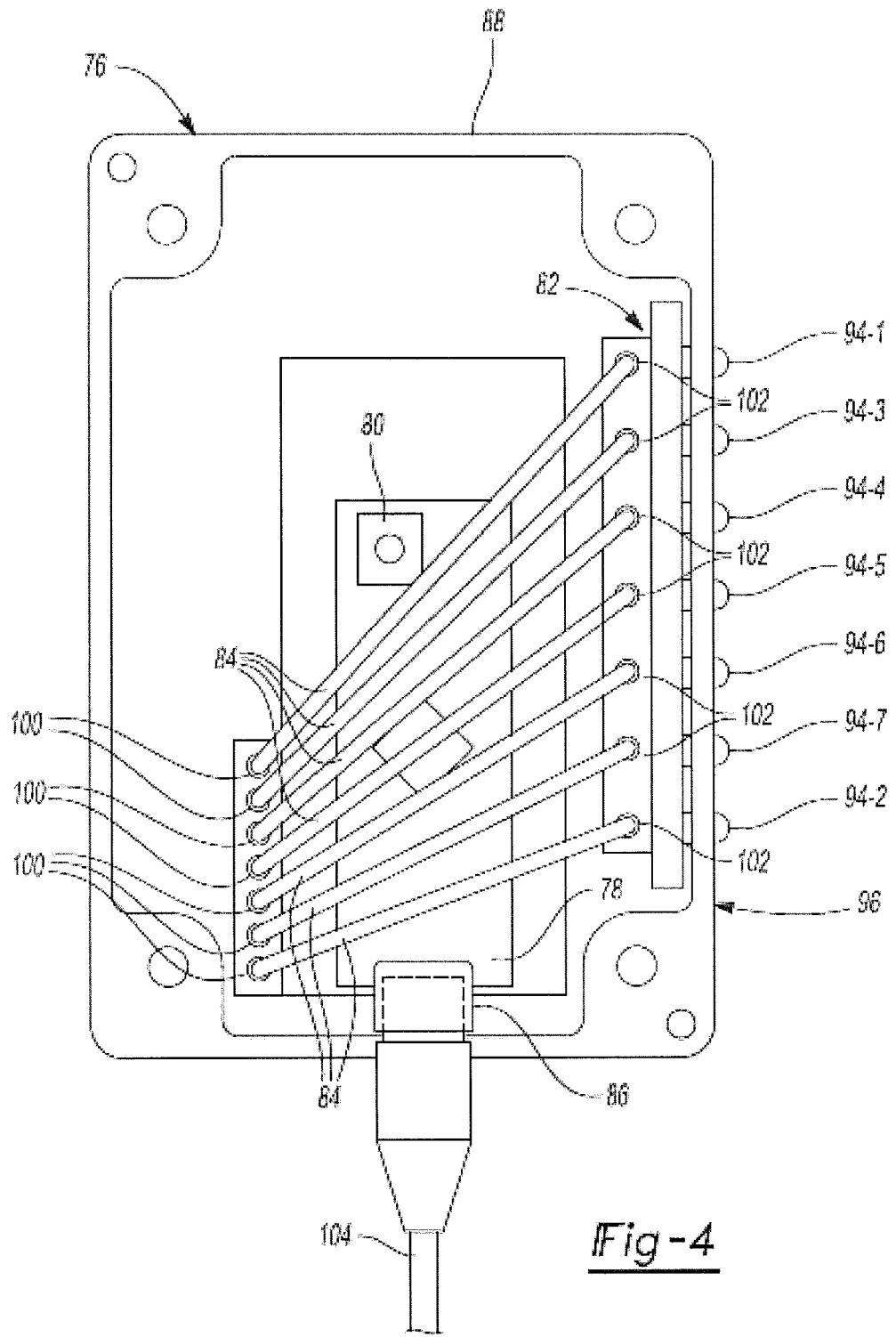
FIG. 4 is a front view of the crimp tool monitoring device with a cover of the device removed.

Referring now to FIGS. 2-4, the device 58 includes a housing 76, a crimp tool monitoring module 78, a crimp tool angle sensor 80, a crimp tool angle indicator 82, a plurality of wires 84, and a micro universal serial bus (USB) port 86. The housing 76 may be made from polycarbonate and includes a base 88 and a cover 90 that attaches to the base 88 using a plurality of fasteners 92. When the cover 90 is attached to the base 88, the housing 76 fully encloses the crimp tool monitoring module 78 and the crimp tool angle sensor 80 so that the crimp tool monitoring module 78 and a crimp tool angle sensor 80 are sealed inside the housing 76. In addition, the housing at least partially encloses the crimp tool angle indicator 82 and the micro USB port 86.

In one example, the crimp tool monitoring module 78 includes an Arduino micro board programmed using C#. In another example, the crimp tool monitoring module 78 includes additional modules as discussed with reference to FIG. 8 below. In another example, the crimp tool monitoring module 78 includes one or more of the various elements to which the term module may refer as discuss below.

The crimp tool angle sensor 80 measures the roll, pitch, and/or yaw angle of the crimp tool 12. In one example, the crimp tool angle sensor 80 includes a tri-axis accelerometer/gyrometer that measures the roll, pitch, and yaw angles of the crimp tool 12. In another example, the crimp tool angle sensor 80 includes a dual-axis accelerometer/gyrometer that measures the roll and pitch angles of the crimp tool 12. The crimp tool angle sensor 80 may be mounted to the crimp tool monitoring module 78 using pins (not shown).

The crimp tool angle indicator 82 indicates the pitch angle of the crimp tool 12 to the operator 10 using visual (e.g., light), audio (e.g., sound), and/or tactile (e.g., vibration) feedback. In the example shown, the crimp tool angle indicator 82 includes a plurality of lights (e.g., light emitting diodes) 94. The device 58 is positioned relative to the crimp tool 12 so that the lights 94 are visible to the operator 10 throughout the crimping process. For example, the lights 94 may be disposed on a rear surface 96 of the housing 76 that is parallel to the rear surface 32 of the head 26 of the crimp tool 12. In addition, the lights 94 are arranged in a row 98 that is parallel to a plane in which the pitch angle is disposed (e.g., the plane defined by the axes 62 and 64).

The lights 94 include a first light 94-1 disposed at a first end of the row and a second light 94-2 disposed at a second end of the row opposite the first end. In addition, the lights 94 include a third light 94-3, a fourth light 94-4, a fifth light 94-5, a sixth light 94-6, and a seventh light 94-7 that are all disposed between the first and second lights 94-1 and 94-2.

The wires 84 connect outputs 100 of the crimp tool monitoring module 78 to inputs 102 of the crimp tool angle indicator 82. Each of the inputs 102 are connected to one of the lights 94. The micro USB port 86 enables the device 58 to receive power from a USB cable 104. In addition, the micro USB port 86 enables the device 58 to exchange data with other devices using the USB cable 104. In various implementations, the device 58 may communicate with other devices using bluetooth communication instead of using the USB cable 104, which would eliminate the need for the micro USB port 86 and any possible failure modes associated therewith.

In various implementations, the device 58 may be powered by one or more batteries that are stored in the device 58. Additionally or alternatively, the device 58 may be powered by an electrical line that extends along the length of the air hose that supplies compressed air to the crimp tool 12. The electrical line may include a USB cable when the electrical line is used for both supplying power to the device 58 and for enabling the device 58 to exchange data with other devices. The electrical line may include a two-conductor wire when the electrical line is simply used for supplying power to the device 58.

In one example, the electrical line is housed inside of a second hose (not shown) that is coupled to and/or formed integrally with the air hose. The air hose may have a first diameter (e.g., ⅜ inches), and the second hose may have a second diameter (e.g., ¼ inches) that is less than the first diameter. The air hose may be connected to the crimp tool 12 using a flexible connection (not shown) that allows the crimp tool 12 to rotate relative to the air hose about a single axis without twisting the air hose. Similarly, the electrical line may be connected to the device 58 using a flexible connection (not shown) that allows the device 58 to rotate relative to the electrical line about a single axis without twisting the electrical line.

Figure 8:
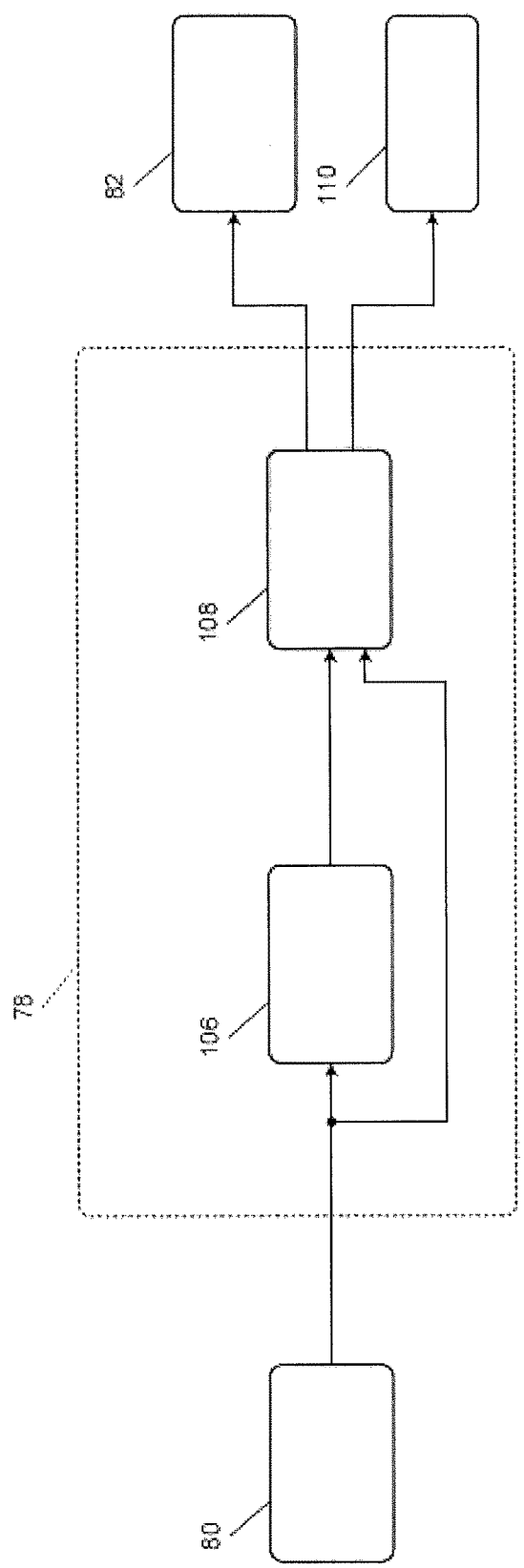
FIG. 8 is a functional block diagram of an example crimp tool monitoring module according to the present disclosure.

Referring now to FIG. 8, an example implementation of the crimp tool monitoring module 78 includes a flange section module 106 and a diagnostic module 108. The flange section module 106 identifies which one of the flange sections 16a-16f on which the crimp tool 12 is disposed based on the roll angle, the pitch angle, and/or the yaw angle of the crimp tool 12. The flange section module 106 receives the roll angle, the pitch angle, and/or the yaw angle from the crimp tool angle sensor 80.

In one example, the flange section module 106 compares the roll angle measured by the crimp tool angle sensor 80 to predetermined roll angle ranges for each of the flange sections 16a-16f. If the measured roll angle is within one of the predetermined roll angle ranges for one of the flange sections 16a-16f, the flange section module 106 identifies that flange section as the flange section on which the crimp tool 12 is disposed. Otherwise, the flange section module 106 determines that the crimp tool 12 is not disposed on any of the flange sections 16a-16f.

In some cases, two or more of the predetermined roll angle ranges for the flange sections 16a-16f may overlap. If the measured roll angle is within two or more of the predetermined roll angle ranges for the flange sections 16a-16f, the flange section module 106 may compare the pitch angle measured by the crimp tool angle sensor 80 to predetermined pitch angle ranges for those flange sections. If the measured pitch angle is within one of the predetermined pitch angle ranges for one of those flange sections, the flange section module 106 identifies that flange section as the flange section on which the crimp tool 12 is disposed. The flange section module 106 outputs the identified one of the flange sections 16a-16f to the diagnostic module 108.

The diagnostic module 108 determines whether the roll angle, the pitch angle, and/or the yaw angle of the crimp tool 12 is/are within a predetermined range corresponding to the identified one of the flange sections 16a-16f. In one example, the diagnostic module 108 determines whether the pitch angle of the crimp tool 12 is within a predetermined range (e.g., +/−15 degrees). The roll and yaw angles of the crimp tool 12 may changes as the crimp tool 12 moves along the flange 16 during the crimping process. In contrast, the operator 10 may attempt to maintain the pitch angle of the crimp tool 12 at a fixed value (e.g., 0 degrees) throughout the crimping process. Thus, the predetermined range for the pitch angle of the crimp tool 12 may be the same for all of the flange sections 16a-16f.

The diagnostic module 108 may also control the crimp tool angle indicator 82 to indicate whether the pitch angle of the crimp tool 12 is within the predetermined range. In one example, if the pitch angle is within the predetermined range, the diagnostic module 108 constantly illuminates one or more of the lights 94-1 through 94-7 without flashing the illuminated lights. The diagnostic module 108 may determine which one of the lights 94-1 through 94-7 to illuminate based on where the pitch angle is within the predetermined range. For example, if the pitch angle is at or near the middle of the predetermined range (e.g., within +/−2 degrees), the diagnostic module 108 may illuminate the fifth light 94-5, which is in the middle of the row.

If the pitch angle is between the middle of the row and the top of the row, the diagnostic module 108 may illuminate one of the third and fourth lights 94-3 and 94-4 to indicate the same. The diagnostic module 108 may illuminate the third light 94-3 when the pitch angle ranges from 3 degrees to 7 degrees. The diagnostic module 108 may illuminate the fourth light 94-4 when the pitch angle ranges from 7 degrees to 11 degrees.

If the pitch angle is between the middle of the row and the bottom of the row, the diagnostic module 108 may illuminate one of the sixth and seven lights 94-6 and 94-4. The diagnostic module 108 may illuminate the sixth light 94-6 when the pitch angle ranges from −3 degrees to −7 degrees. The diagnostic module 108 may illuminate the seventh light 94-7 when the pitch angle ranges from −7 degrees to −11 degrees.

If the pitch angle is at or near the top of the predetermined range (e.g., from 11 degrees to 15 degrees), the diagnostic module 108 illuminates the first light 94-1, which is at the top of the row. If the pitch angle is at or near the bottom of the predetermined range (e.g., from −11 degrees to −15 degrees), the diagnostic module 108 illuminates the second light 94-2, which is at the bottom of the row. In this manner, the diagnostic module 108 controls the crimp tool angle indicator 82 to indicate where the pitch angle of the crimp tool 12 is within the predetermined range.

The lights 94 may illuminate in different colors to indicate where the crimp angle is within the predetermined range. In one example, the lights 94-3 through 94-7 may illuminate in green to indicate that the crimp angle is at or near the middle of the predetermined range. In another example, the first and second lights 94-1 and 94-2 may illuminate in red to indicate that the crimp angle is at or near the top or bottom of the predetermined range.

If the pitch angle is outside of the predetermined range, the diagnostic module 108 may flash one or more of the lights 94-1 through 94-7. The diagnostic module 108 may determine which one(s) of the lights 94-1 through 94-7 to flash based on whether the pitch angle is greater than or less than the predetermined range. In one example, if the pitch angle is greater than an upper limit (e.g, 15 degrees) of the predetermined range, the diagnostic module 108 flashes the first light 94-1 to indicate the same. In another example, if the pitch angle is less than a lower limit (e.g, −15 degrees) of the predetermined range, the diagnostic module 108 flashes the second light 94-2 to indicate the same.

The diagnostic module 108 may also store the pitch angle, or simply whether the pitch angle is within the predetermined range, and the corresponding one of the flange sections 16a-16f. Additionally or alternatively, the diagnostic module 108 may output the pitch angle, or simply whether the pitch angle is within the predetermined range, and the corresponding one of the flange sections 16a-16f to an assembly plant module 110. In turn, the assembly plant module 110 may store the pitch angle, or simply whether the pitch angle is within the predetermined range, and the corresponding one of the flange sections 16a-16f. The assembly plant module 110 may be remote from the crimp tool monitoring module 78, and the diagnostic module 108 may communicate with the assembly plant module 110 via a hardwired or wireless connection (e.g., WiFi, bluetooth).

The information stored in the diagnostic module 108 and/or the assembly plant module 110 may be used to identify and repair improperly assembled portion(s) of the weather strip 14 before the vehicle 22 is delivered to a customer. The diagnostic module 108 and/or the assembly plant module 110 may identify a portion of the weather strip 14 corresponding to one of the flange sections 16a-16f as improperly crimped when the pitch angle for that flange section is outside of the predetermined range for at least a predetermined period. The diagnostic module 108 and/or the assembly plant module 110 may change the status of that portion of the weather strip 14 to properly crimped when that portion of the weather strip 14 is re-crimped without the pitch angle falling outside of the predetermined range for the predetermined period.

The assembly plant module 110 may control an assembly line (not shown) on which the crimping process is performed. The assembly plant module 110 may stop the assembly line when the pitch angle is outside of the predetermined range for at least the predetermined period. The assembly plant module 110 may restart the assembly line when the portion(s) of the weather strip 14 that were improperly crimped are re-crimped without the pitch angle falling outside of the predetermined range for the predetermined period.

Figure 9:
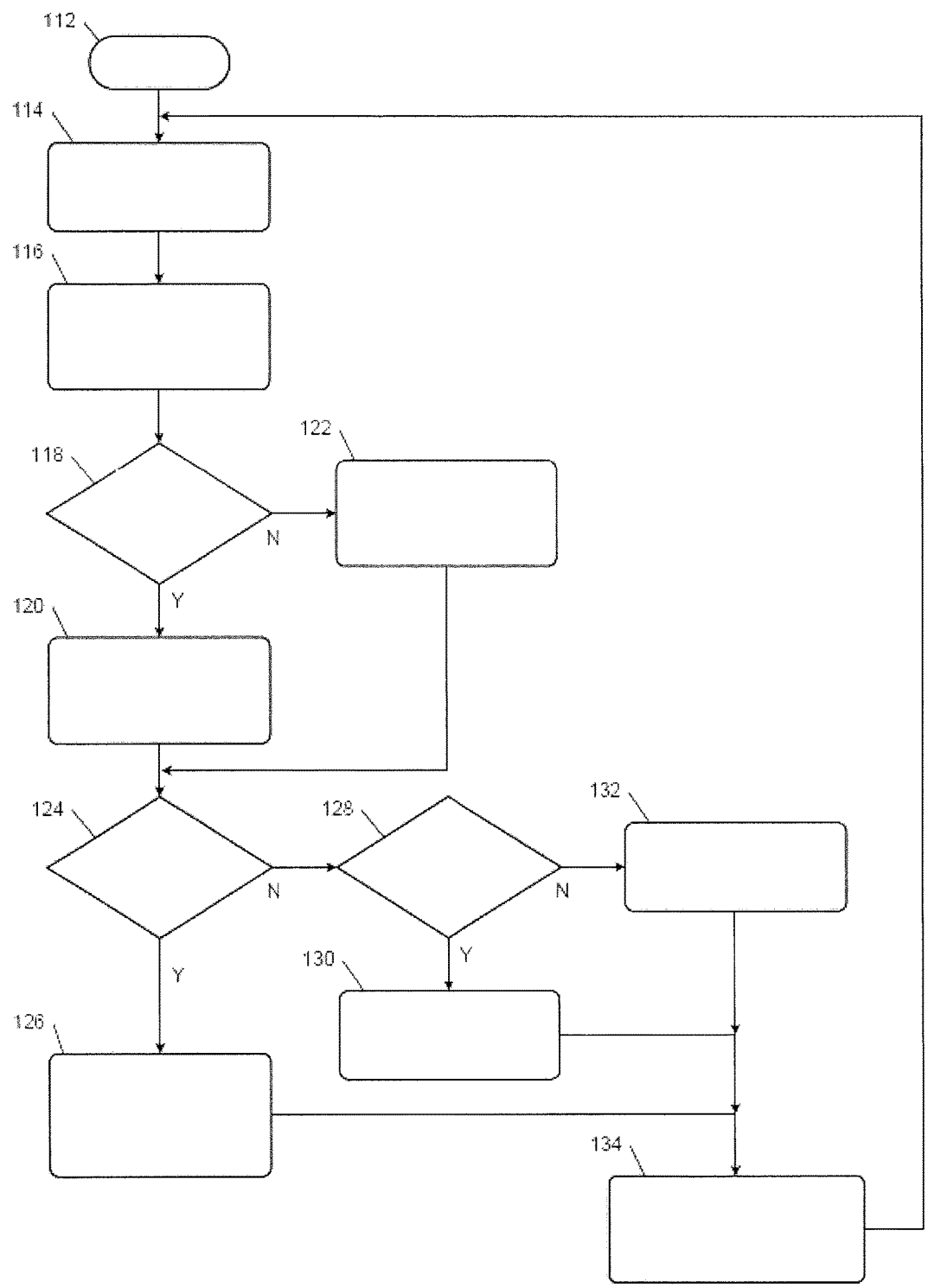
FIG. 9 is a flowchart illustrating an example method for monitoring the angle of the crimp tool according to the present disclosure.

Referring now to FIG. 9, a method for monitoring an angle of the crimp tool 12 and for indicating the same to the operator 10 begins at 112. The method is described in the context of the modules shown in FIGS. 3, 4, and 8. However, the particular modules that perform the steps of the method may be different than the modules mentioned below and/or the method may be implemented apart from the modules shown in FIGS. 3, 4, and 8.

At 114, the crimp tool angle sensor 80 measures the roll, pitch, and/or yaw angle of the crimp tool 12. At 116, the flange section module 106 compares the roll angle to the predetermined roll angle ranges for the flange sections 16a-16f. At 118, the flange section module 106 determines whether the roll angle corresponds to more than one of the flange sections 16a-16f.

If the roll angle corresponds to more than one of the flange sections 16a-16f, the method continues at 120. Otherwise, the method continues at 122. At 122, the flange section module 106 identifies the one of the flange sections 16a-16f on which the crimp tool 12 is disposed based on the roll angle alone. At 120, the flange section module 106 identifies the one of the flange sections 16a-16f on which the crimp tool 12 is disposed based on the roll angle and the pitch angle.

At 124, the diagnostic module 108 determines whether the pitch angle of the crimp tool 12 is within the predetermined range. If the pitch angle of the crimp tool 12 is within the predetermined range, the method continues at 126. Otherwise, the method continues at 128. At 126, the diagnostic module 108 illuminates one of the lights 94. The diagnostic module 108 may determine which one of the lights 94 to illuminate based on the pitch angle.

At 128, the diagnostic module 108 determines whether the pitch angle of the crimp tool 12 is greater than the upper limit of the predetermined range. If the pitch angle of the crimp tool 12 is greater than the upper limit of the predetermined range, the method continues at 130 and flashes the first light 94-1. Otherwise, the method continues at 132 and flashes the second light 94-2.

At 134, the diagnostic module 108 stores and/or transmits the roll, pitch, and/or yaw angle of the crimp tool 12, or simply whether the pitch angle is within the predetermined range, and the corresponding flange section. As indicated above, the diagnostic module 108 may output the roll, pitch, and/or yaw angle of the crimp tool 12, or simply whether the pitch angle is within the predetermined range, and the corresponding flange section to the assembly plant module 110. In turn, the assembly plant module 110 may store the roll, pitch, and/or yaw angle of the crimp tool 12, or simply whether the pitch angle is within the predetermined range, and the corresponding flange section.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a crimp tool angle sensor that measures at least one of a roll angle of a crimp tool, a pitch angle of the crimp tool, and a yaw angle of the crimp tool;
a flange section module that identifies a flange section of a vehicle on which the crimp tool is disposed based on at least one of the roll angle, the pitch angle, and the yaw angle; and
a diagnostic module that determines whether at least one of the roll angle, the pitch angle, and the yaw angle is within a predetermined range.

2. The system of claim 1 wherein:
the crimp tool angle sensor measures the pitch angle of the crimp tool; and
the diagnostic module determines whether the pitch angle is within the predetermined range.

3. The system of claim 2 wherein:
the crimp tool angle sensor measures the roll angle of the crimp tool and the pitch angle of the crimp tool; and
the flange section module identifies the flange section on which the crimp tool is disposed based on at least one of the roll angle and the pitch angle.

4. The system of claim 3 wherein the flange section module identifies the flange section on which the crimp tool is disposed based on the roll angle.

5. The system of claim 3 wherein the flange section module identifies the flange section on which the crimp tool is disposed based on the roll angle and the pitch angle.

6. The system of claim 1 wherein the diagnostic module controls a crimp tool angle indicator to indicate whether the pitch angle is within the predetermined range.

7. The system of claim 6 further comprising a housing that encloses the crimp tool angle sensor, the flange section module, the diagnostic module, and at least part of the crimp tool angle indicator, wherein the housing is separate from and removably attached to the crimp tool.

8. The system of claim 6 further comprising the crimp tool angle indicator, wherein:
the crimp tool indicator includes a plurality of lights;
the diagnostic module illuminates at least one of the plurality of lights when the pitch angle is within the predetermined range; and
the diagnostic module flashes at least one of the plurality of lights when the pitch angle is outside the predetermined range.

9. The system of claim 8 wherein the diagnostic module illuminates different ones of the plurality of lights based on where the pitch angle is within the predetermined range.

10. The system of claim 8 wherein:
the plurality of lights are arranged in a row and include a first light disposed at a first end of the row, a second light disposed at a second end of the row, and a third light disposed between the first and second lights;
the diagnostic module illuminates the third light when the pitch angle is within the predetermined range; and
the diagnostic module flashes at least one of the first and second lights when the pitch angle is within the predetermined range.

11. The system of claim 10 wherein the row is parallel to a plane in which the pitch angle is disposed.

12. A method comprising:
measuring at least one of a roll angle of a crimp tool, a pitch angle of the crimp tool, and a yaw angle of the crimp tool using a crimp tool angle sensor;
identifying a flange section of a vehicle on which the crimp tool is disposed based on at least one of the roll angle, the pitch angle, and the yaw angle; and
determining whether at least one of the roll angle, the pitch angle, and the yaw angle is within a predetermined range.

13. The method of claim 12 further comprising:
measuring the pitch angle of the crimp tool; and
determining whether the pitch angle is within the predetermined range.

14. The method of claim 13 wherein:
measuring the roll angle of the crimp tool and the pitch angle of the crimp tool; and
identifying the flange section on which the crimp tool is disposed based on at least one of the roll angle and the pitch angle.

15. The method of claim 14 further comprising identifying the flange section on which the crimp tool is disposed based on the roll angle.

16. The method of claim 14 further comprising identifying the flange section on which the crimp tool is disposed based on the roll angle and the pitch angle.

17. The method of claim 12 further comprising controlling a crimp tool angle indicator to indicate whether the pitch angle is within the predetermined range.

18. The method of claim 17 wherein the crimp tool indicator includes a plurality of lights, the method further comprising:
illuminating at least one of the plurality of lights when the pitch angle is within the predetermined range; and
flashing at least one of the plurality of lights to flash when the pitch angle is outside the predetermined range.

19. The method of claim 18 illuminating different ones of the plurality of lights based on where the pitch angle is within the predetermined range.

20. The method of claim 18 wherein the plurality of lights are arranged in a row and include a first light disposed at a first end of the row, a second light disposed at a second end of the row, and a third light disposed between the first and second lights, the method further comprising:
instructing the third light to illuminate when the pitch angle is within the predetermined range; and
instructing the at least one of the first and second lights to flash when the pitch angle is within the predetermined range.

* * * * *